(12) United States Patent  
Baarman et al.

(10) Patent No.: US 7,668,148 B2
(45) Date of Patent: Feb. 23, 2010

(54) METHOD OF CARRIER TYPE PREEMPTION

(75) Inventors: Matthew A Baarman, Bartlett, IL (US); Jahan Z. Ali, Markham (CA); Holly T. Forseth, Chandler, AZ (US); John C. May, West Dundee, IL (US); Daniel J. McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 271 days.

(21) Appl. No.: 11/412,003

(22) Filed: Apr. 26, 2006

(65) Prior Publication Data

US 2007/0253398 A1 Nov. 1, 2007

(51) Int. Cl.
*H04B 7/212* (2006.01)
(52) U.S. Cl. .............................. 370/347; 370/330
(58) Field of Classification Search ............... 370/321, 370/330, 149, 252, 279, 328, 331, 347; 455/445, 455/450
See application file for complete search history.

(56) References Cited

U.S. PATENT DOCUMENTS 5,790,527 A * 8/1998 Janky et al. ................. 370/330
6,804,532 B1 * 10/2004 Moon et al. ............. 455/552.1

* cited by examiner

*Primary Examiner*—Sam Bhattacharya
(74) *Attorney, Agent, or Firm*—Valerie M. Davis; Terri S. Hughes; Indira Saladi

(57) ABSTRACT

A method and apparatus are provided for allocating radio frequency carriers in a radio service area having a plurality of radio frequency TDMA carriers and FDMA carriers. The method includes the steps of receiving a call, when the received call is a FDMA call and a FDMA carrier is not available for the FDMA call, then preempting a pre-existing call on a TDMA carrier of the plurality of radio frequency TDMA carriers for the FDMA call and when the received call is a TDMA call and a TDMA slot is not available for the TDMA call, then preempting a pre-existing FDMA call on a TDMA capable carrier of the plurality of radio frequency TDMA carriers for the TDMA call.

20 Claims, 3 Drawing Sheets

METHOD OF CARRIER TYPE PREEMPTION

FIELD OF THE INVENTION

The field of the invention relates to communication systems and more particularly to public safety communication systems.

BACKGROUND

Public safety radio systems have been widely used by police and fire departments for decades. Such systems are typically based upon a one-point to many-points format wherein a transmission by one radio is heard by a number of other radios. Signals are often transmitted and received over a single radio frequency carrier in such systems.

Public service radios often use frequency division multiple access (FDMA) for communications. Under such a system, individual radios transmit a request to talk to a zone controller. In response, the zone controller may return an authorization along with an identifier of the carrier to transmit on.

Individual users are often included within specific talk groups and a transmission often includes an identifier of the user and/or talk group. The zone controller identifies the talk group and routes the transmission appropriately.

In order to reduce congestion, public safety radio systems also use time division multiple access (TDMA) radio carriers. However, many existing radios only exchange signals under a FDMA format and, as a result, TDMA carriers have had to coexist side-by-side with FDMA carriers. However, the maintenance of separate carriers is inefficient and a need consequently exists for a method of sharing carriers.

DETAILED DESCRIPTION

Figure 1:
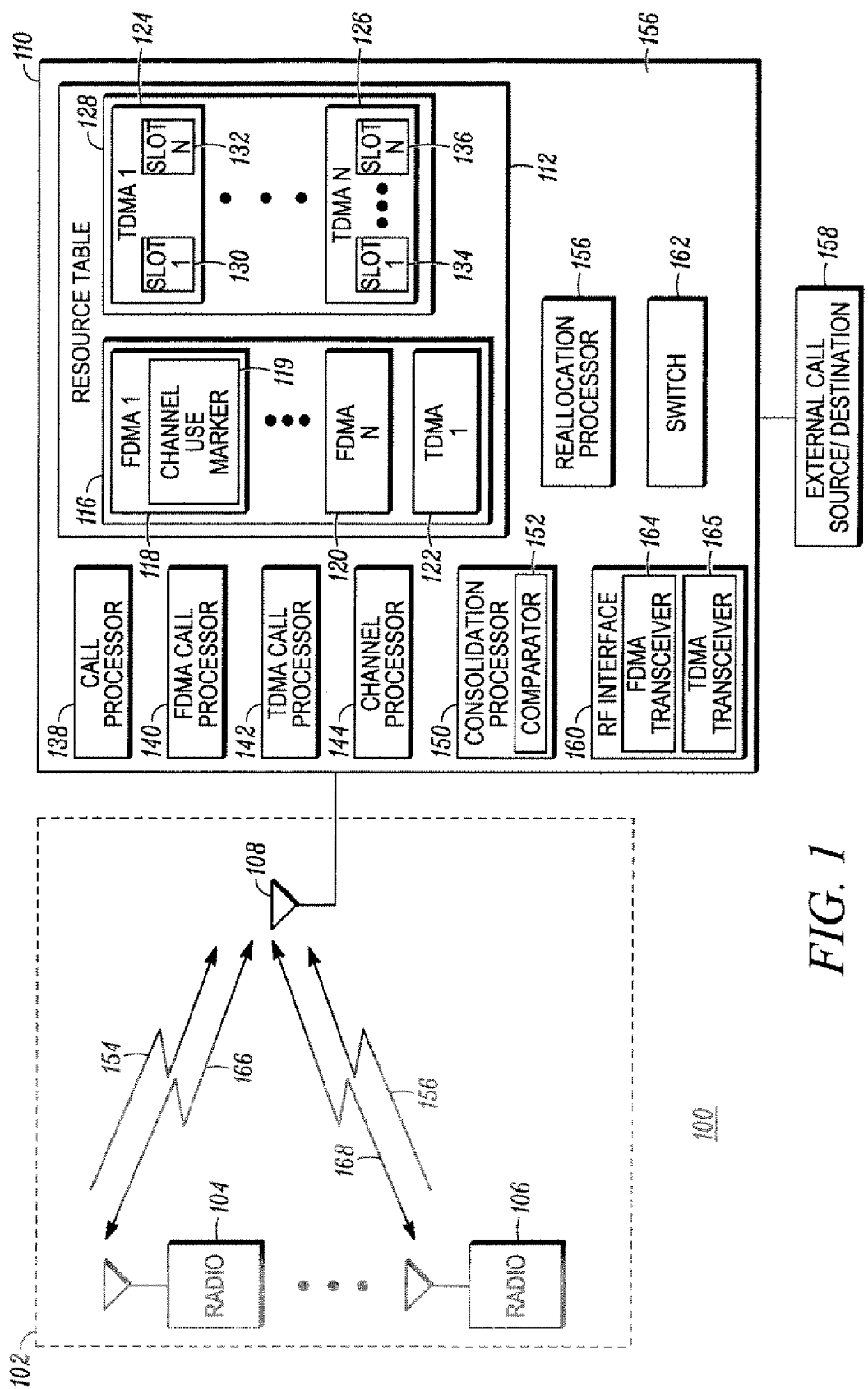
FIG. 1 is a block diagram of a system for preempting carrier types among calls under an illustrated embodiment of the invention.

FIG. 1 is a block diagram of a system 100 using carrier type preemption shown generally in accordance with an illustrated embodiment of the invention. Included within the system 100 is a base station 110 that controls communication access among a number of radios 104, 106 and between the radios 104, 106 and external source/destination 158. For example, where the radios 104, 106 are used by police officers, an external source/destination 158 may be a police dispatcher. In any case, the external source/destination 158 is external to the base station 110 and allows for communication with the radios 104, 106.

The system 100 allocates and reallocates radio frequency carriers (also termed "channels") in a radio service coverage area (also known as a "service area") 102 having a plurality of radio frequency TDMA carrier frequencies (carriers) and FDMA carrier frequencies. The method includes the steps of receiving a call, when the received call is a FDMA call and a FDMA carrier is not available for the FDMA call, then preempting a pre-existing call on a TDMA carrier of the plurality of radio frequency TDMA carriers for the FDMA call and when the received call is a TDMA call and a TDMA slot is not available for the TDMA call, then preempting a pre-existing FDMA call on a TDMA capable carrier of the plurality of radio frequency TDMA carriers for the TDMA call.

Figure 2:
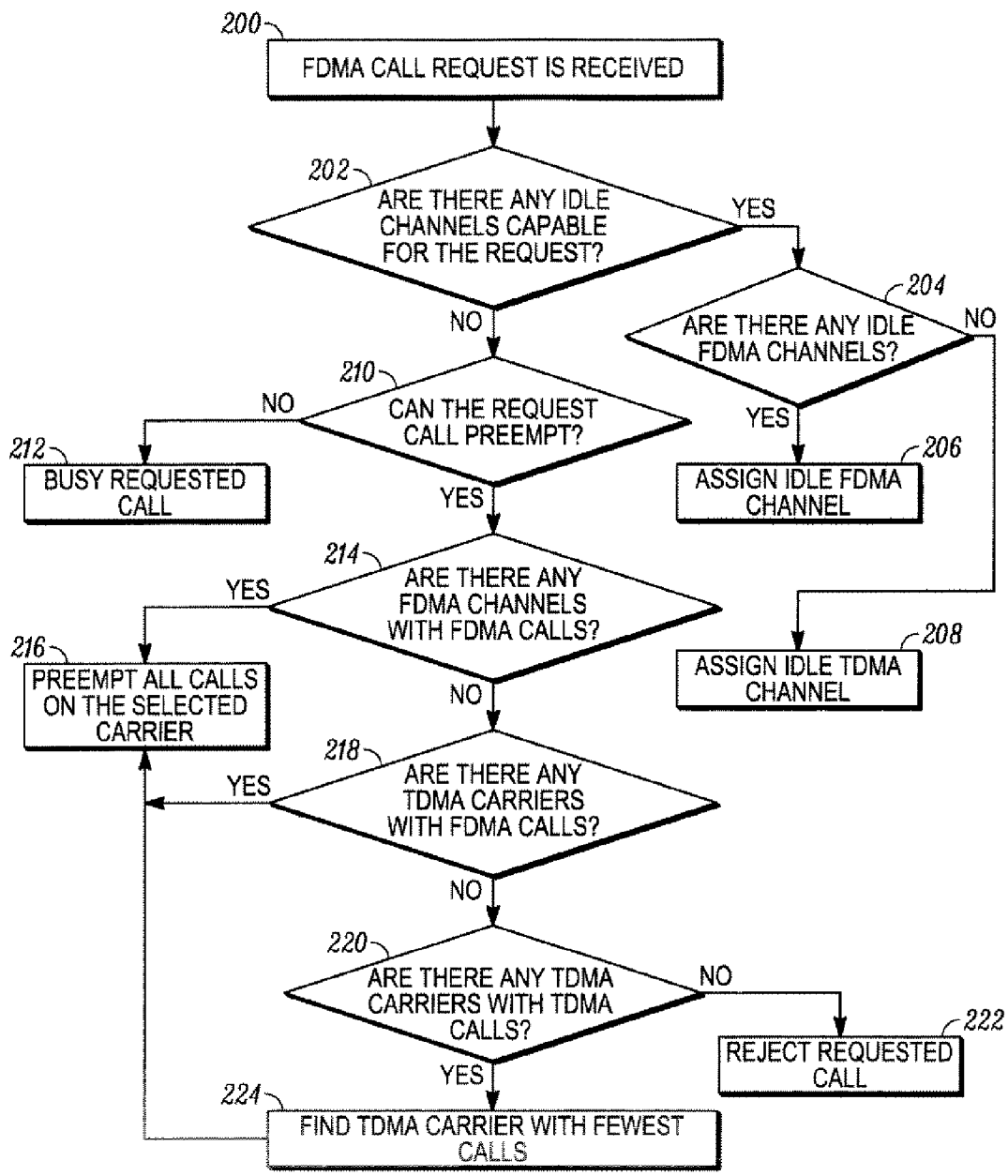
FIG. 2 is a flow chart of method steps that may be used by the system of FIG. 1 for processing FDMA calls.
Figure 3:
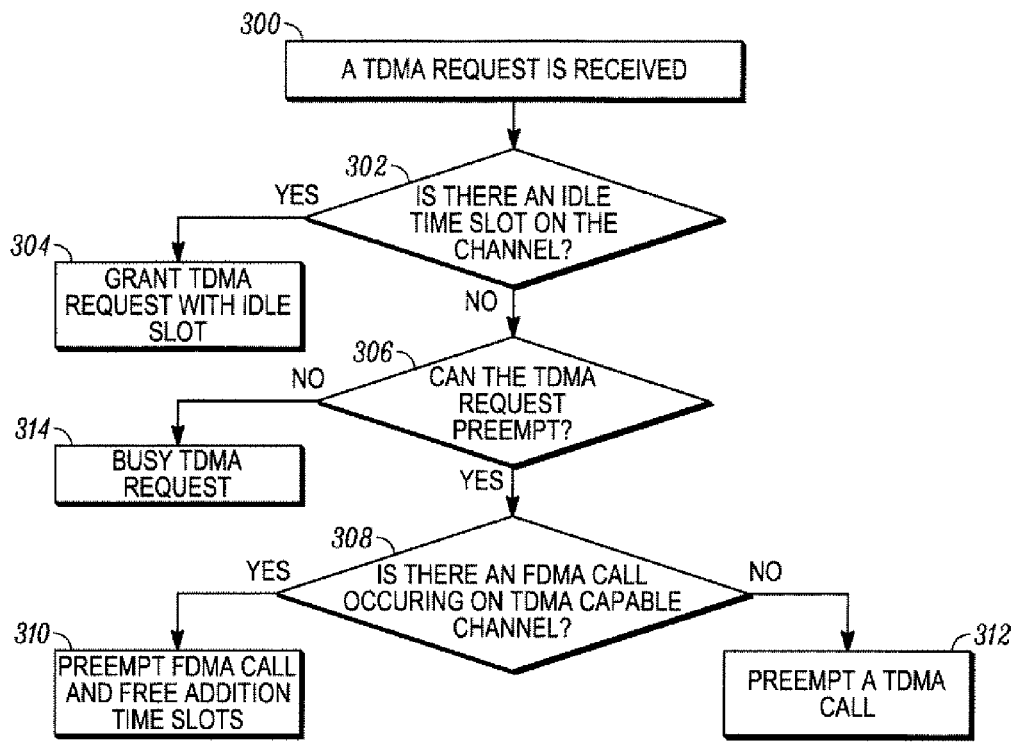
FIG. 3 is a flow chart of method steps that may be used by the system of FIG. 1 for processing TDMA calls.

The allocation of TDMA and FDMA carriers may be based upon a priority that incorporates any of a number of different factors (e.g., talkgroup priority, type of call being preempted, whether someone is transmitting on an active call, etc.). FIG. 2 depicts a set of steps that may be followed in the case of receipt of a FDMA call request. FIG. 3 depicts a set of steps that may be followed following receipt of a TDMA call request. Reference will be made to FIGS. 2 and 3 as appropriate to an understanding of the invention.

Available within the service area 102 is a number of FDMA carriers 118, 120 (shown within a FDMA resource list 116) and a number of TDMA carriers 124, 126 (shown within a TDMA resource list 128) for use by radios 104, 106.

While only two FDMA carriers 118, 120 and two TDMA carriers 124, 126 are shown in FIG. 1, it should be understood that any number of FDMA carriers 118, 120 and TDMA carriers 124, 126 may be used within the system 100.

Similarly, it should be understood that while only two radios 104, 106 are shown within the service area 102, any number of radio 104, 106 may be used. It may also be understood that a number of the radios (e.g., 104) operate under a FDMA format and at least some other number of the radios (e.g., 106) operate under a TDMA format.

Each TDMA carrier 124, 126 may be divided up into a number of time slots. In this regard, a first TDMA carrier 124 may have slots 130, 132 and a second TDMA carrier 126 may have slots 134, 136. Again, while the TDMA carriers 124, 126 are shown as having only two slots, it should be understood that TDMA carriers 124, 126 may have any number of slots.

It may be noted that each TDMA carrier could support an FDMA call. In this case, the FDMA call would use the entire TDMA carrier bandwidth for the one FDMA call.

The number of FDMA carriers 118, 120 and TDMA carriers 124, 126 may be appropriate to the number of radios 104, 106 available for use within the service area 102. For example, considering a use factor of 50%, if there were ten FDMA radios 104 within the system 100, then there would be five FDMA carriers 118, 120 available within the system 100. Similarly, if each TDMA carrier 124, 126 has five slots and twenty TDMA radios 106 are present within the system 100 and the radios 106 have a use factor of 50%, then at least two TDMA carriers 124, 126 would be provided for use within the system 100.

In use, FDMA radios 104 may transmit an access request 154 to the base station 110 on a carrier assigned as a control channel. The access request 154 comprises an identifier of the radio 106 and/or a destination identifier (e.g., a telephone number or group identifier).

The access request 154 may be received 200, 300 by a RF interface 160 and transferred to a call processor 138 where a unique call identifier is assigned to a call associated with the access request 154. A determination may then be made as to the type of request being made and whether the radio 106 is registered within the system 100. If the request can be authenticated as authorized within the system 100 and a determination can be made as to the type of access required, then the request is transferred to the appropriate call handling resource. In this case, the access request 154 may be transferred to a FDMA call processor 140.

Within the FDMA call processor 140, the access request 154 may be processed to determine a destination of the request and to set up the resources to complete the request. As a first step, the FDMA call processor 140 may determine 202 if there are any idle carriers capable of servicing the request. In this regard, the FDMA call processor 140 may transfer a channel availability request to a channel processor 144. The channel processor 144 may determine the availability of resources by retrieving a set of channel use markers 119 from the lists 116, 128 for the presence of at least one available carrier 118, 120, 124, 126.

If the channel processor 144 returns an affirmative answer indicating that sufficient resources are available to process the call, then the access request 154 may be processed. Next, the FDMA processor 140 may search the FDMA resource list 116 within resource table 112 to determine 204 if there is an idle FDMA carrier 118, 120.

If an idle FDMA carrier is found, then the FDMA call processor 140 may assign 206 the idle FDMA carrier to the radio 104 in response to the access request 154. Alternatively, the FDMA call processor 140 may determine that there are no FDMA carriers 118, 120 available. In this case, the FDMA call processor 140 may transfer a request for an alternate carrier to a channel processor 144 and continue to scan the FDMA resource list 116.

In this case, the channel processor 144 may search channel use markers of each TDMA slot 130, 132, 134, 136 for a TDMA carrier 124, 126. If the channel processor 144 should find an unused TDMA carrier (e.g., 124), then the channel processor 144 may mark the channel marker for each slot 130, 132 as being occupied and add the TDMA carrier 124 (now labeled TDMA carrier 122) to the FDMA resource list 116. Once the identifier of the TDMA carrier 124 is added to the FDMA resource list 116, the FDMA call processor 140 may identify the TDMA carrier 124 as an available carrier and assign 208 the idle TDMA carrier 122 to the radio 104.

If an idle FDMA or TDMA carrier is identified, the FDMA call processor 140 may select the FDMA or TDMA carrier for use with the access request 154. If an idle FDMA or TDMA carrier cannot be identified, then the FDMA call processor 140 determines whether the access request 154 can preempt 210 other previously established calls. If not, then the FDMA call processor 140 may compose and send 212 a busy signal in response to the access request 154.

In the case where an idle FDMA or TDMA carrier is found, the FDMA call processor 140 may send an identifier of the carrier to the radio. The FDMA call processor 140 may also mark the carrier as being in use within the FDMA resource list 116 by setting a channel use marker 119 and inserting the unique call identifier of the call into a portion of the FDMA resource list 116 reserved for the carrier 118.

Upon receiving the identification of the available carrier 118, the FDMA call processor 140 may transfer an identifier of the available carrier 118 and radio 104 to the RF interface 160 along with instructions to set up a connection with the radio 104 on the assigned FDMA or TDMA carrier. The RF interface 160 may transfer the carrier assignment to the radio 104 over the control channel and assign a particular FDMA transceiver 164 or TDMA transceiver 165 within the RF interface 160 to service the call with the radio 104. In response, the radio 104 may tune to the assigned carrier and begin transmitting.

If the access request 154 includes a telephone number, then the FDMA call processor 140 may also send a connection request (including the telephone number) to a switch 162 that functions to form an external connection with the callee identified by the telephone number. Upon completion of the connection with the callee, the switch 162 may create a connection between the external connection and the FDMA transceiver 164 assigned to handle the call with the radio 104. Upon completion of the end-to-end connection between the radio 104 and callee, the user of the radio 104 may begin conversing with the callee on the assigned carrier 166.

Similarly, if a call request 156 is transmitted from a TDMA radio 106 and received 300 by the call processor 138, the process may proceed in a similar manner. In this case, the call processor 138 may assign the TDMA call request to a TDMA call processor 142.

The TDMA call processor 142 may search the TDMA list 128 to determine 302 if there is an idle time slot on a carrier 124, 126. If the TDMA call processor 142 determines that there is an idle time slot, then the TDMA call processor 142 may grant the idle slot 304 for use by the radio 106 in response to the TDMA call request 156. The TDMA call processor 142 may also select a TDMA transceiver 165 and transfer instructions to the RF interface 160 and switch 162 to set up the appropriate connections. The RF interface 160 and switch 162 may set up the connections and the user may begin to converse with the callee over the assigned carrier 168.

Alternatively, the TDMA call processor 142 may determine that there are no idle slots available to service the call request 156. In this case, the TDMA call processor 142 may determine whether the radio 106 can preempt 306 other pre-existing calls. If not, then the TDMA call processor 142 may return a busy signal 314 in response to the TDMA call request 156.

The determination of priority for radios 104, 106 may be made based upon the content of a priority list 170. If the list 170 indicates that a radio 104, 106 has a higher relative priority, then the radio may preempt calls of other radios 104, 106 with a lower priority.

Preemption may occur in any of a number of different situations. For example, in the case of a FDMA call, a determination 214 is first made by the FDMA processor 140 as to whether there are any FDMA channels with FDMA calls of a lower priority by comparison of calls with a relative position within the priority list 170. If radios 104, 106 are both FDMA radios and a first radio 104 had already been allocated a carrier and the second radio 106 where to transmit an access request 154, then the relative priorities of the calls of the radios 104, 106 may be compared. If the call of the second radio 106 were to have a higher priority, then the call of the first radio 104 would be preempted 216 and the carrier being used by the first radio 104 would be reallocated to the second radio 106.

In a second situation, a determination 218 is made by the FDMA processor 140 as to whether there are any TDMA carriers being used for FDMA calls. If a call of the second radio 106 using a TDMA carrier for a FDMA call were to have a lower priority than a call of the first radio 104, then the call would be preempted 216 and the TDMA carrier would be reallocated to the first radio 104 for the FDMA call.

In still another situation, a determination 220 is made by the FDMA processor 140 as to whether there are any TDMA carriers being used by calls of radios 104, 106 of a lower priority. In this case, the FDMA processor 140 may send a request to the channel processor 144 to find 224 the TDMA carrier with the fewest number of pre-existing TDMA calls. Once the TDMA carrier with the fewest (e.g. smallest) number of TDMA calls of a lower priority is identified, the FDMA processor 140 may preempt 216 the TDMA calls on the identified carrier and assign the TDMA carrier to the higher priority FDMA call. If there are no TDMA carriers with users of a lower priority, then the FDMA processor 140 may queue 222 the access request.

Preemption may occur with TDMA call requests in a somewhat similar manner. In this case, the TDMA processor 142 may determine 308 if there are any FDMA calls of a lower priority occurring on a TDMA capable channel. If so, then the lower priority FDMA call on the TDMA capable carrier is preempted 310 by the TDMA call and the TDMA capable carrier is reallocated to the TDMA call. If there are no pre-existing FDMA calls on a TDMA capable carrier, then the TDMA call may preempt 312 a pre-existing TDMA call of a lower priority.

A specific embodiment of method and apparatus for preempting carrier types have been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of allocating radio frequency carriers in a radio service area having a plurality of radio frequency time division multiple access (TDMA) carriers and frequency division multiple access (FDMA) carriers, such method comprising:
   receiving a call;
   when the received call is a FDMA call and a FDMA carrier is not available for the FDMA call, preempting a pre-existing call on a TDMA carrier of the plurality of radio frequency TDMA carriers for the FDMA call; or
   when the received call is a TDMA call and a TDMA slot is not available for the TDMA call, preempting a pre-existing FDMA call on a TDMA capable carrier of the plurality of radio frequency TDMA carriers for the TDMA call.

2. The method of allocating radio frequency carriers as in claim 1 further comprising determining a relative priority of the received call and returning a busy signal when the pre-existing call is of the same or higher relative priority.

3. The method of allocating radio frequency carriers as in claim 1 further comprising preempting a pre-existing call on an FDMA carrier where the received call is a FDMA call with a higher relative priority.

4. The method of allocating radio frequency carriers as in claim 1 further comprising preempting a pre-existing FDMA call on an a TDMA capable carrier where the received call is a FDMA call with a higher relative priority.

5. The method of allocating radio frequency carriers as in claim 1 further comprising preempting a pre-existing call on a TDMA channel where the received call is a TDMA call with a higher relative priority.

6. The method of allocating radio frequency carriers as in claim 1 wherein the step of preempting the pre-existing call on the TDMA carrier for the FDMA call further comprising selecting a TDMA carrier with a smallest relative number of pre-existing calls.

7. The method of allocating radio frequency carriers as in claim 1 further comprising allocating the FDMA call to a FDMA carrier when a FDMA carrier is available.

8. The method of allocating radio frequency carriers as in claim 1 further comprising allocating the TDMA call to a TDMA carrier when a TDMA carrier is available.

9. An apparatus for allocating radio frequency carriers in a radio service area having a plurality of radio frequency time division multiple access (TDMA) carriers and frequency division multiple access (FDMA) carriers, such apparatus comprising:
   a call request;
   a FDMA call processor that preempts a pre-existing call on a TDMA carrier of the plurality of radio frequency TDMA carriers when the call request is for a FDMA call and a FDMA carrier is not available for the FDMA call; and
   a TDMA call processor that preempts a pre-existing FDMA call on a TDMA capable carrier of the plurality of radio frequency TDMA carriers for the TDMA call when the received call is a TDMA call and a TDMA carrier is not available for the TDMA call.

10. The apparatus for allocating radio frequency carriers as in claim 9 further comprising a priority list of relative priorities of calls.

11. The apparatus for allocating radio frequency carriers as in claim 9 further comprising a pre-existing FDMA call on an FDMA carrier that is preempted by the call request where the call request is a FDMA call with a higher relative priority.

12. The apparatus for allocating radio frequency carriers as in claim 9 further comprising a pre-existing FDMA call on an TDMA capable carrier that is preempted when the call request is a FDMA call with a higher relative priority.

13. The apparatus for allocating radio frequency carriers as in claim 9 further comprising a pre-existing TDMA call on a TDMA channel that is preempted when the call request is a TDMA call with a higher relative priority.

14. The apparatus for allocating radio frequency carriers as in claim 9 wherein the FDMA call processor that preempted the TDMA call on the TDMA carrier further comprises a channel processor that selects a TDMA carrier with a smallest relative number of pre-existing calls.

15. A method of allocating radio frequency carriers in a radio service area having a plurality of radio frequency time division multiple access (TDMA) carriers and frequency division multiple access (FDMA) carriers, such method comprising:
   receiving a call; and
   when the received call is a FDMA call and a FDMA carrier is not available for the FDMA call, preempting a pre-existing call on a TDMA carrier of the plurality of radio frequency TDMA carriers for the FDMA call.

16. The method of allocating radio frequency carriers as in claim 15 further comprising determining a relative priority of the received call and returning a busy signal when the pre-existing call is of the same or higher relative priority.

17. The method of allocating radio frequency carriers as in claim 15 further comprising preempting a pre-existing call on an FDMA carrier where the received call is a FDMA call with a higher relative priority.

18. The method of allocating radio frequency carriers as in claim 15 further comprising preempting a pre-existing FDMA call on a TDMA capable carrier where the received call is a FDMA call with a higher relative priority.

19. The method of allocating radio frequency carriers as in claim 15 further comprising preempting a pre-existing call on a TDMA channel where the received call is a TDMA call with a higher relative priority.

20. The method of allocating radio frequency carriers as in claim 15 wherein the step of preempting the pre-existing call on the TDMA carrier for the FDMA call further comprising selecting a TDMA carrier with a smallest relative number of pre-existing calls.

* * * * *